US012374784B2

(12) United States Patent
Trotter

(10) Patent No.: US 12,374,784 B2
(45) Date of Patent: Jul. 29, 2025

(54) RADOME MOUNTING SYSTEM

(71) Applicant: ASTRONICS CONNECTIVITY SYSTEMS & CERTIFICATION CORP., Waukegan, IL (US)

(72) Inventor: Steve Trotter, Palatine, IL (US)

(73) Assignee: ASTRONICS CONNECTIVITY SYSTEMS AND CERTIFICATION CORP., Waukegan, IL (US)

( * ) Notice: Subject to any disclaimer, the term of this patent is extended or adjusted under 35 U.S.C. 154(b) by 149 days.

(21) Appl. No.: 18/228,232

(22) Filed: Jul. 31, 2023

(65) Prior Publication Data

US 2024/0047862 A1 Feb. 8, 2024

Related U.S. Application Data

(60) Provisional application No. 63/394,421, filed on Aug. 2, 2022.

(51) Int. Cl.
*H01Q 1/28* (2006.01)

(52) U.S. Cl.
CPC ............. *H01Q 1/286* (2013.01); *H01Q 1/281* (2013.01)

(58) Field of Classification Search
CPC .......... H01Q 1/28; H01Q 1/281; H01Q 1/286; H01Q 21/28
See application file for complete search history.

(56) References Cited

U.S. PATENT DOCUMENTS

| | | | |
|---|---|---|---|
| 10,640,194 B2 | 5/2020 | Zimmerman | |
| 10,897,071 B2 | 1/2021 | Dasanayaka | |
| 2018/0351243 A1* | 12/2018 | Lewis | H01Q 1/282 |

FOREIGN PATENT DOCUMENTS

| | | | |
|---|---|---|---|
| EP | 3239038 A1 * | 11/2017 | B64C 1/36 |

* cited by examiner

*Primary Examiner* — Hoang V Nguyen
(74) *Attorney, Agent, or Firm* — Pauley Erickson & Swanson

(57) ABSTRACT

A mounting system for an aircraft fuselage includes one or more fixed anchors attached to the fuselage. A plurality of vertically adjustable anchors are likewise attached to the fuselage, wherein each vertically adjustable anchor includes a spinwheel on a threaded shaft. An adapter plate is attached to the fixed anchors and the adjustable anchors, wherein a contact surface of the spinwheel directly engages with the adapter plate.

19 Claims, 6 Drawing Sheets

RADOME MOUNTING SYSTEM

BACKGROUND OF THE INVENTION

Field of the Invention

This invention relates generally to a mounting system for external aircraft electronics and/or hardware, such as a radome.

Description of Prior Art

A radome and other components are often affixed to an outer skin of an aircraft fuselage. Given the precise tolerance required as well as the confined space available within and surrounding a radome, installation has been problematic and often difficult to duplicate. Traditional installations require trial and error in order to attach the radome in a secure manner on a variety of fuselage geometries. One such installation technique requires anchoring and shimming connection points around an adapter plate until the adapter plate is free of movement and vibration relative to the fuselage.

A need therefore exists for a mounting system that is flexible and reliable and one that is repeatable across all geometries and models of aircraft fuselages.

SUMMARY OF THE INVENTION

The invention generally relates to a mounting system and aircraft radome for electronics and/or hardware such as antennae, communications systems, etc. A preferred mounting system includes one or more fixed anchors and a plurality of vertically adjustable anchors each attached to an aircraft fuselage.

An adapter plate is preferably affixed to the anchors such that the fixed anchors are centrally located along outer edges of the adapter plate and the vertically adjustable anchors are positioned at ends of the adapter plate.

Each vertically adjustable anchor preferably includes a spinwheel on a threaded shaft. The adapter plate is attached to the fixed anchors and the adjustable anchors so that a contact surface of the spinwheel directly engages with the adapter plate.

The subject, mounting system may further include a plurality of fasteners attached between the fixed anchors and the adapter plate. Likewise, a plurality of fasteners may be attached between each spinwheel of the vertically adjustable anchors the adapter plate.

In a preferred embodiment, each of the plurality of fasteners are accessible from a top of the adapter plate. Such an arrangement facilitates assembly and modification of the mounting system.

The adapter plate is preferably fitted with electronics and hardware including antennae and/or other communication and navigation equipment within the radon and a domed cover. A skirt may be attached to a lower edge of the adapter plate to bridge the lower edge of the adapter plate to the fuselage.

Other objects and advantages will be apparent to those skilled in the art from the following detailed description taken in conjunction with the appended claims and drawings.

DETAILED DESCRIPTION OF THE INVENTION

The present invention provides a mounting system for electronics and/or hardware such as a radome, antennae, etc. for an aircraft fuselage 10.

Figure 1:
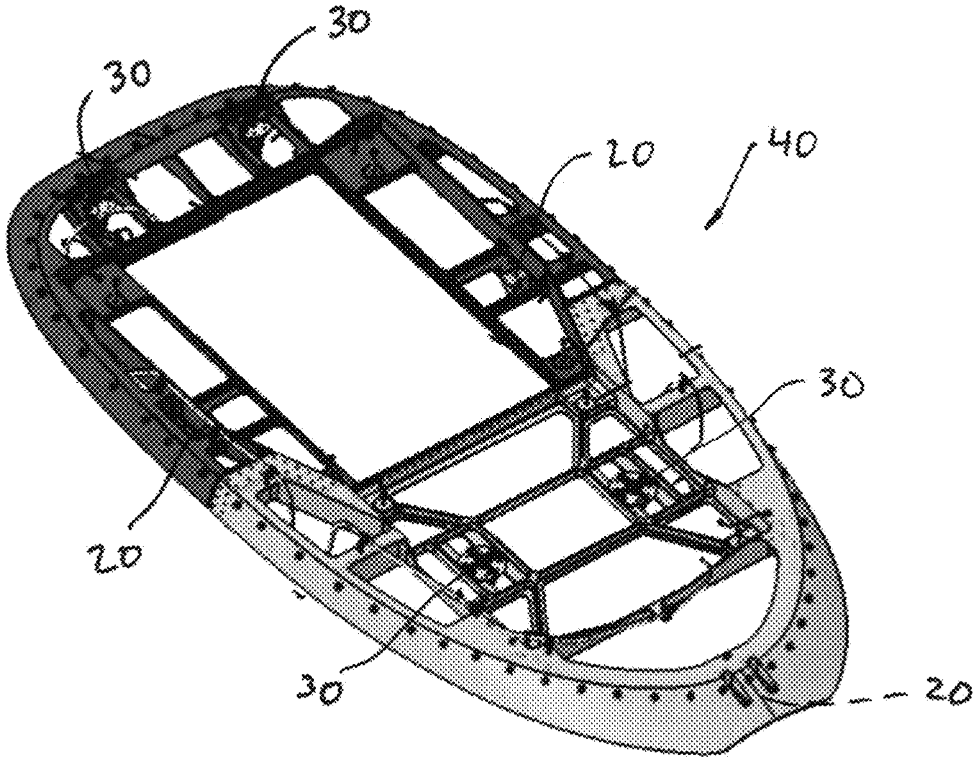
FIG. 1 shows a front perspective view of an adapter plate according to one embodiment of the invention.
Figure 2:
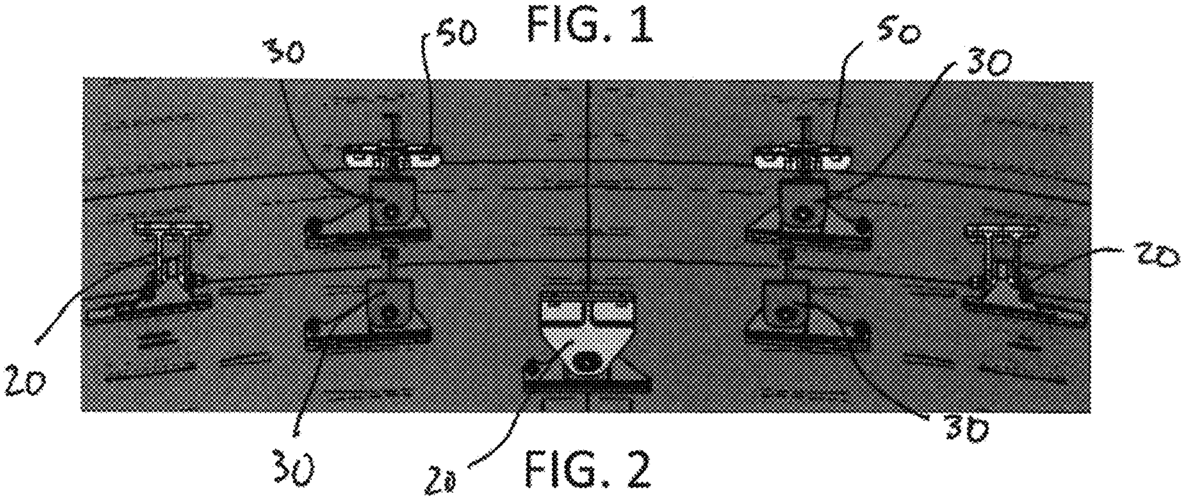
FIG. 2 shows a front view of a set of anchors mounted on a fuselage according to one embodiment of the invention.

As shown in FIGS. 1 and 2, a preferred mounting, system includes one or more fixed anchors 20 attached to the fuselage 10. In addition, a plurality of vertically adjustable anchors 30 are attached to the fuselage 10. An adapter plate 40 is then affixed to the anchors 20, 30, as described in more detail below.

The anchors 20, 30 may be attached to the fuselage 10 using, shoulder bolts and may include pivoting bases to accommodate the adapter plate 40.

Figure 8:
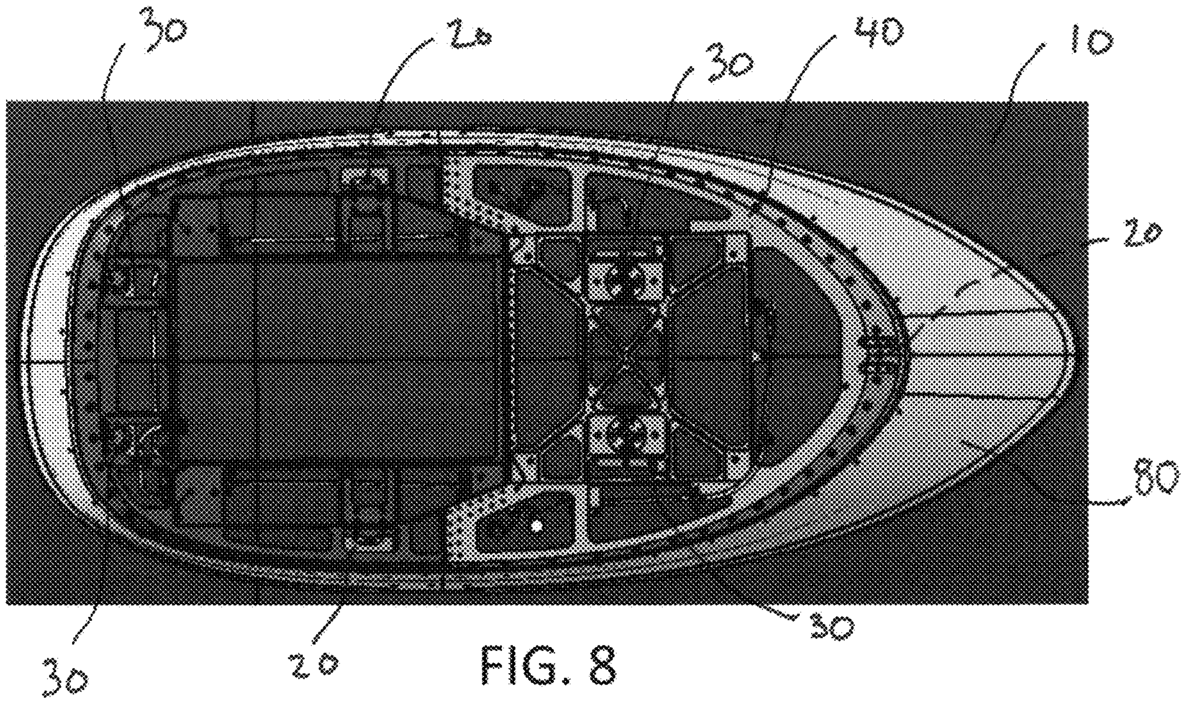
FIG. 8 shows a top view of an adapter plate mounted to a fuselage according to one embodiment of the invention.

As shown in FIG. 2, in one preferred embodiment, the fixed anchors 20 are interspersed with the vertically adjustable anchors 30. Specifically, as shown in the figure, the fixed anchors 20 may be dispersed along outer edges of the adapter plate 40 and the vertically adjustable anchors 30 are positioned between those fixed anchors 20 along the adapter plate 40. More particularly, an arrangement of a single aft fixed anchor 20, two mid-aft vertically adjustable anchors 30, two central fixed anchors 20, and two forward vertically adjustable anchors 30 are shown in FIGS. 1 and 8.

Each vertically adjustable anchor 30 preferably includes a spinwheel 50 on a threaded shaft 60. The spinwheel 50 is preferably aluminum or steel and may include a threaded core or a helical insert, such as a HELICOIL to engage the threaded shaft 60. In one preferred embodiment shown in FIGS. 5 and 7, the spinwheel 50 may be fixed into position with a locking plate 65 which may be additionally affixed with fasteners as shown.

As shown in FIG. 1, an adapter plate 40 is attached to the fixed anchors 20 and the adjustable anchors 30, wherein a contact surface of the spinwheel 50 directly engages with the adapter plate 40. The adapter plate 40 is thus configured to accommodate aircraft electronics within the radome include antennae and related communications and guidance systems. The adapter plate 40 may be a single piece or a multi-piece assembly. The adapter plate 40 may further include bosses for antenna mounting and/or channels 70 for engagement with anchors 20, 30.

In one preferred embodiment of the invention, the adapter plate 40 includes a channel 70 to accommodate an outer diameter of the spinwheel 50. The contact surface of the spinwheel 50 preferably engages with a connection surface 75 of the adapter plate 40 within the channel 70.

Figure 3:
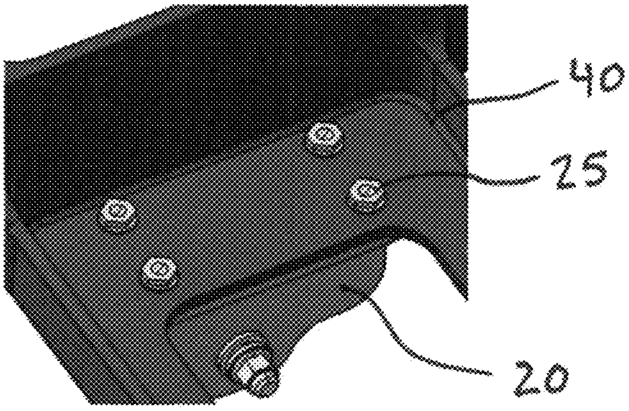
FIG. 3 shows a top perspective view of a fixed anchor according to one embodiment of the invention.

As shown in FIG. 3, the subject mounting system may further include a plurality of fasteners 25 attached between the fixed anchors 20 and the adapter plate 40. The fasteners may comprise nuts and bolts, rivets or other appropriate connectors for maintaining the two components into a fixed position with each other.

Figure 4:
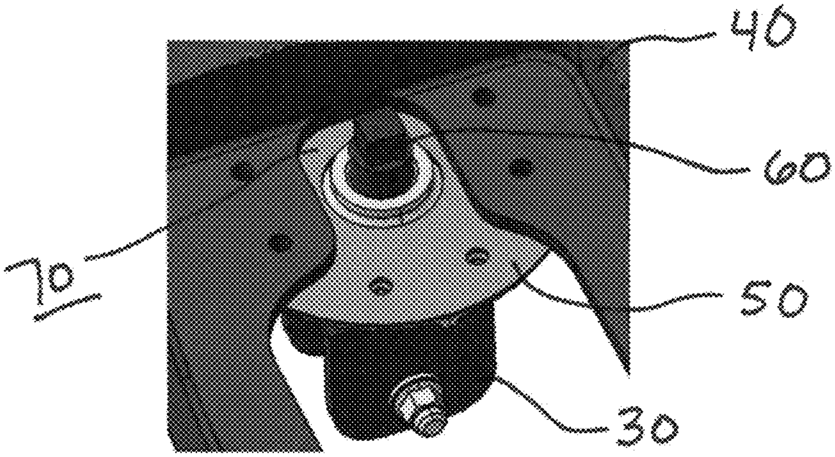
FIG. 4 shows a top perspective view of a vertically adjustable anchor according to one embodiment of the invention.
Figure 5:
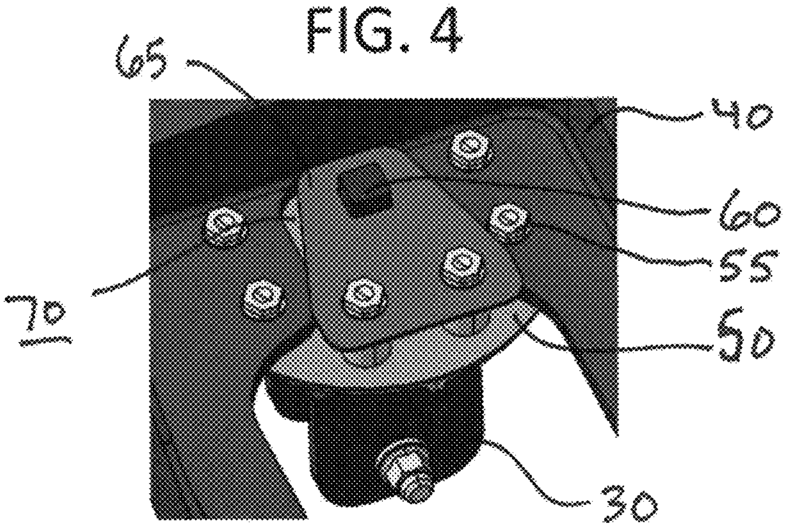
FIG. 5 shows a top perspective view of a vertically adjustable anchor according to one embodiment of the invention.
Figure 6:
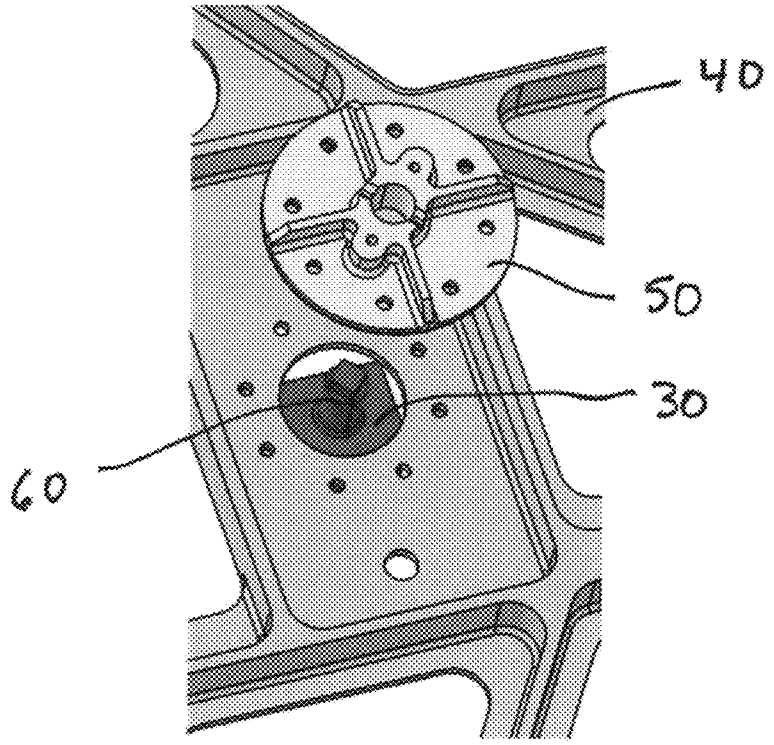
FIG. 6 shows a top perspective view of a vertically adjustable anchor according to one embodiment of the invention.
Figure 7:
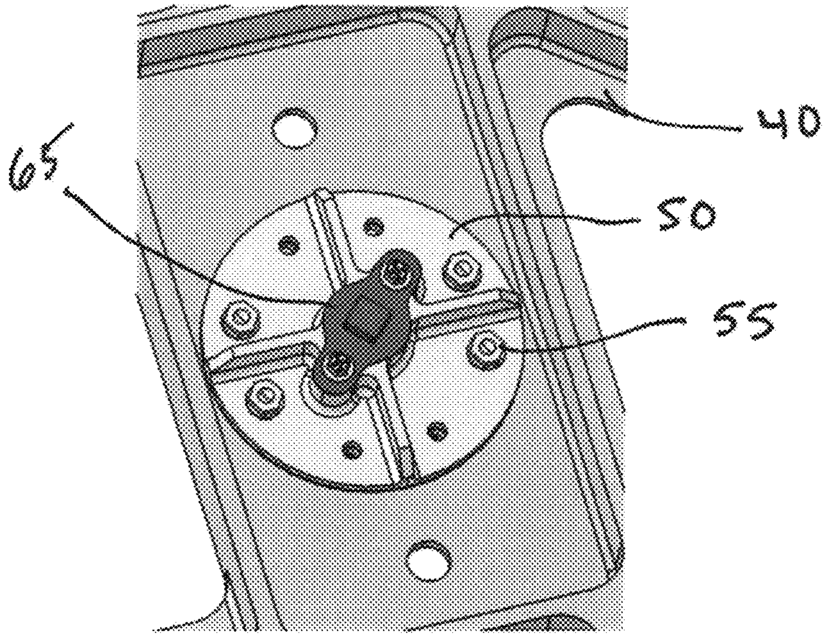
FIG. 7 shows a top perspective view of a vertically adjustable anchor according to one embodiment of the invention.

Likewise, as shown in FIGS. 4-7, the subject mounting system may further include a plurality of fasteners 55 attached between each spinwheel 50 of the vertically adjustable anchors 30 the adapter plate 40. In a preferred embodiment of the invention, the spinwheel 50 may be configured to engage upwardly on the adapter plate 40 in some areas (as shown in FIGS. 4 and 5) and downwardly M other areas (as shown in FIGS. 6 and 7). FIG. 5 shows the additional placement of a locking plate 65 to maintain a desired position of the spinwheel 50. As shown, the threaded shaft 60 may include a square or similar polygonal head that engages with a corresponding aperture in the locking plate 65. Additionally, the locking plate may be affixed with one or more fasteners to the spinwheel 50.

Specifically, as shown in FIGS. 1 and 8, a pair of rearward vertically adjustable anchors 30 may be connected to engage the adapter plate 40 in an upwardly biased connection and a pair of forward vertically adjustable anchors 30 may be connected to engage the adapter plate in a downwardly biased connection. Together, these anchors 20, 30 and a preferred arrangement maintains a tight-fitting and immovable connection between the adapter plate 40 and the fuselage 10. This is critical given the threes exerted on the radome 100 during operation and maintenance of the aircraft—any small tolerance or movement may become much greater during operation.

In a preferred embodiment, each of the plurality of fasteners 25, 55 are accessible from a top of the adapter plate 40. Such an arrangement facilitates assembly and modification of the mounting system.

Figure 12:
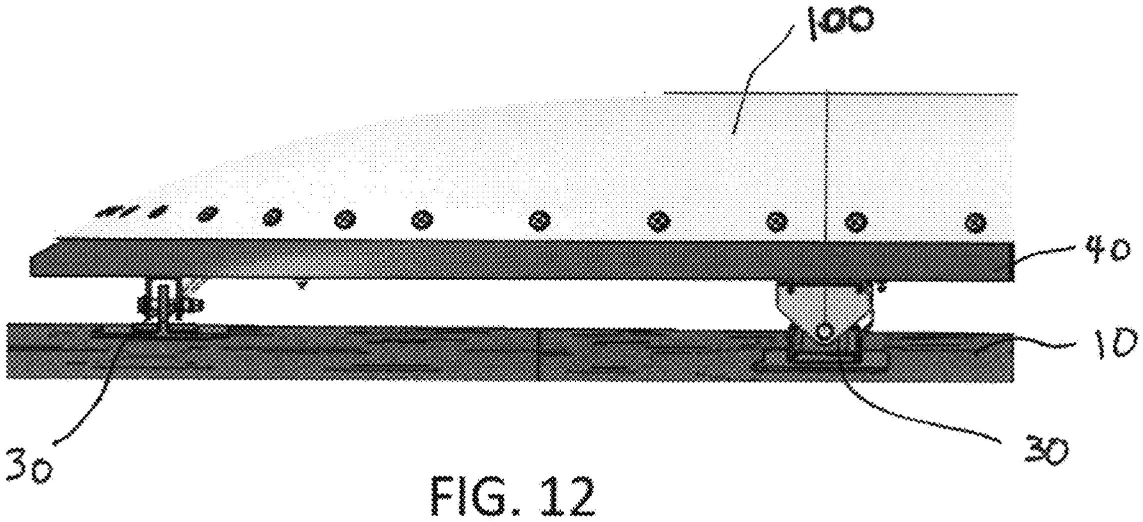
FIG. 12 shows a side view of a radome mounted to a fuselage according to one embodiment of the invention.
Figure 13:
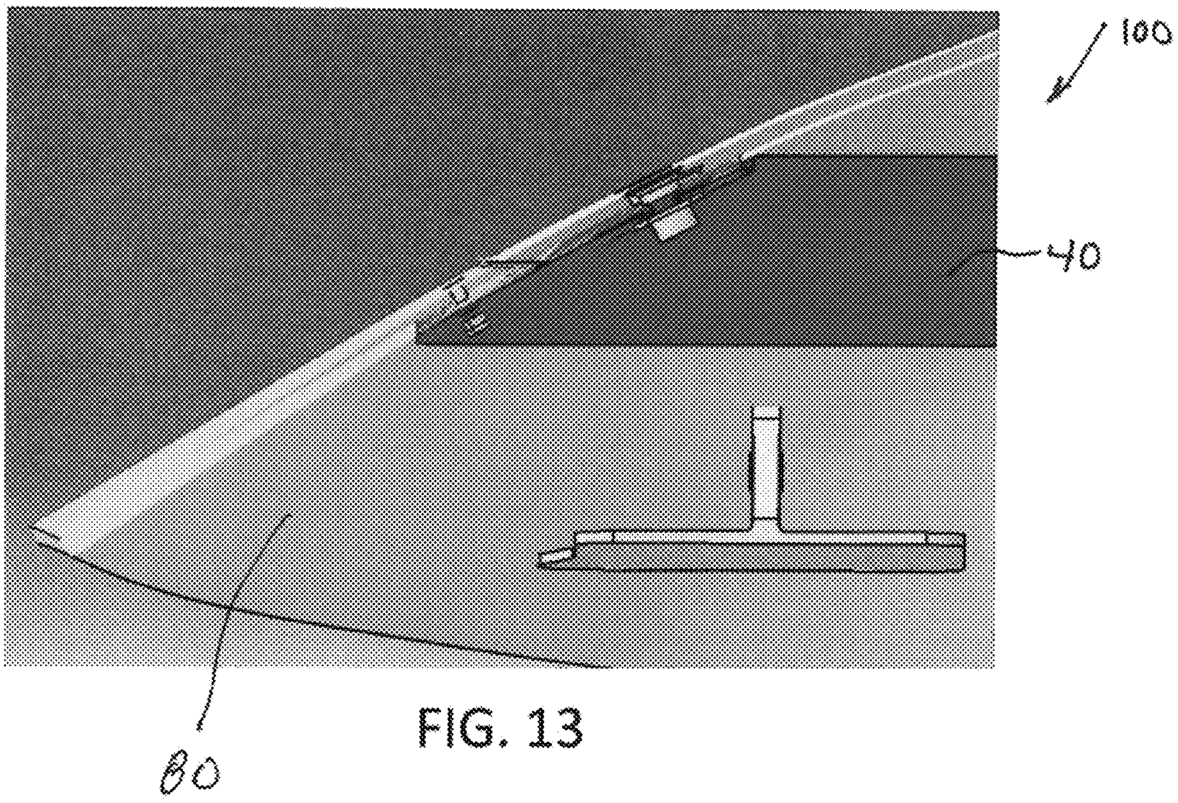
FIG. 13 shows a side view of a radome mounted to a fuselage according to one embodiment of the invention.

The adapter plate 40 is preferably fitted with electronics and hardware including antennae and/or other communication and navigation equipment within the radome and a domed cover. A skirt 80 may be attached to a lower edge of the adapter plate the skirt 80 bridging the lower edge of the adapter plate 40 to the fuselage 10. The skirt preferably enhances aerodynamics and helps protect the hardware and electronics within the radome. The radome extends approximately 6-12 inches over the fuselage 10 and the skirt 80 preferably extends downward from the adapter plate 40 into lush contact with the fuselage 10, such as shown in FIGS. 12 and 13.

A related method for mounting hardware and/or electronics to an aircraft fuselage using the apparatus described above may include attaching two or more fixed anchors 20 to the fuselage 10 using fasteners 25 as described above. Next, a plurality of vertically adjustable anchors 30 may be attached to the fuselage, wherein each vertically adjustable anchor includes a spinwheel 50 on a threaded shaft. The adapter plate 40 is preferably directly engaged with the vertically adjustable anchors 30 wherein a contact surface of the spinwheel 50 directly engages with the adapter plate 40. The respective spinwheels 50 are fastened to the adapter plate 40 each with a plurality of fasteners 55.

Figure 9:
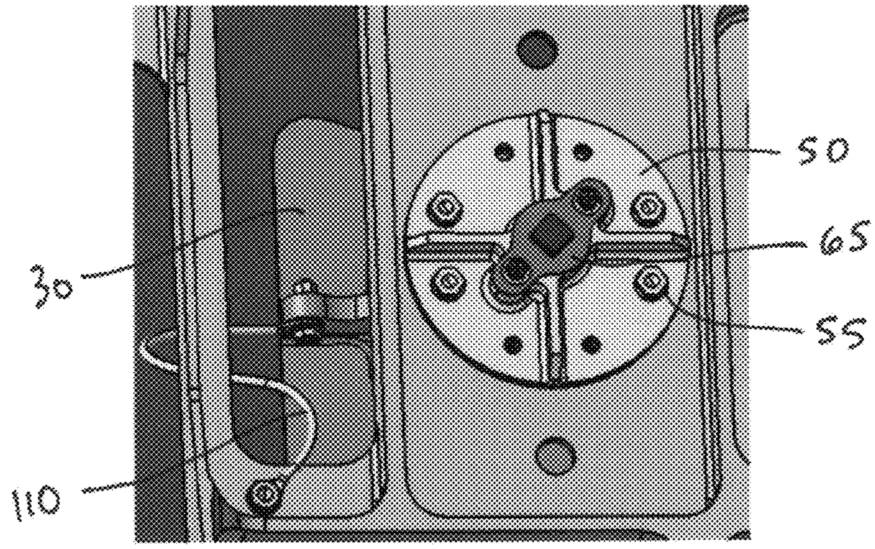
FIG. 9 shows a top view of a vertically adjustable anchor according to one embodiment of the invention.
Figure 10:
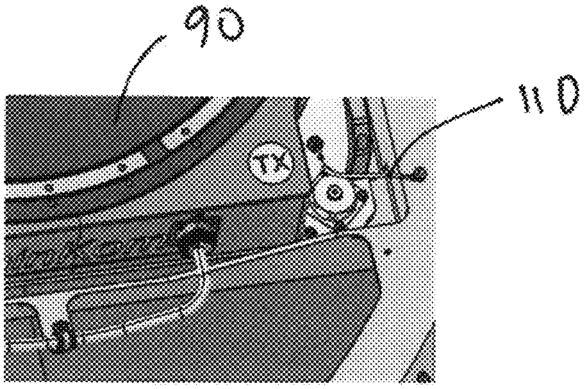
FIG. 10 shows a top perspective view of a connection according to one embodiment of the invention.
Figure 11:
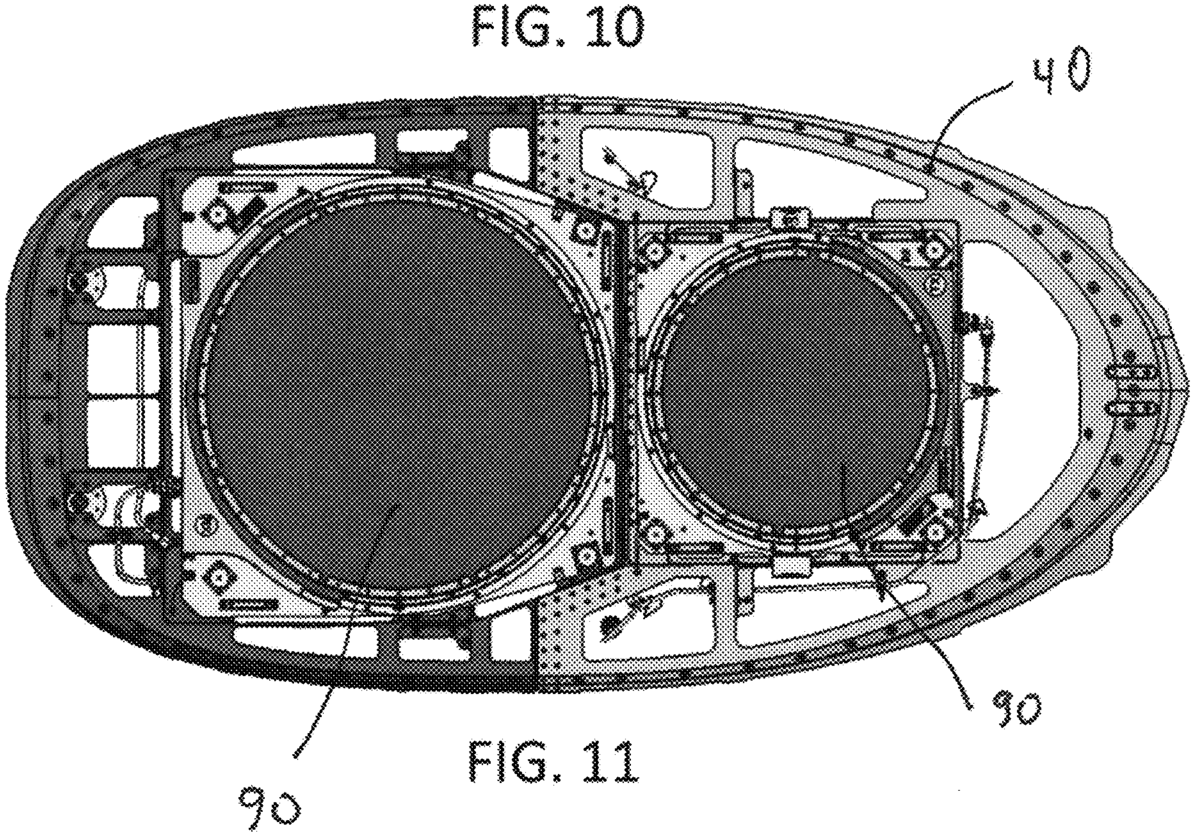
FIG. 11 shows a top view of an adapter plate with hardware mounted to a fuselage according to one embodiment of the invention.

In a preferred embodiment of this invention, the adapter plate 40 is first attached to the fixed anchors 20 and then the adjustable anchors 30. In this manner, at least two fixed points along the adapter plate 40 are established and then the spinwheels 50 are rotated into direct contact with the underside of the adapter plate 40 and, separately, the topside of the adapter plate 40 before fastening the respective spinwheels 50 to the adapter plate 40. In addition, as shown in FIGS. 9 and 10, ground straps 110 may be then attached to each of the antennae 90, the fixed anchors 20 and the adjustable anchors 30, preferably using pre-installed ground screws at each anchor point.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A mounting system for an aircraft fuselage comprising:
one or more fixed anchors attached to the fuselage;
a plurality of vertically adjustable anchors attached to the fuselage, wherein each vertically adjustable anchor includes a spinwheel on a threaded shaft; and
an adapter plate attached to the fixed anchors and the adjustable anchors, wherein a contact surface of the spinwheel directly engages with the adapter plate, wherein the adapter plate includes a channel to accommodate an outer diameter of the spinwheel.

2. The mounting system of claim 1 wherein the spinwheel is one of aluminum or steel.

3. The mounting system of claim 1 wherein the threaded shaft engages with a threaded hole within the spinwheel.

4. The mounting system of claim 1 wherein the fixed anchors and interspersed with the vertically adjustable anchors.

5. The mounting system of claim 1 wherein a plurality of fasteners are attached between each spinwheel and the adapter plate.

6. The mounting system of claim 5 wherein the plurality of fasteners are accessible from a top of the adapter plate.

7. The mounting system of claim 1 further comprising a skirt attached to a lower edge of the adapter plate, the skirt bridging the lower edge of the adapter plate to the fuselage.

8. The mounting system of claim 1 comprising one aft fixed anchor, two mid-aft vertically adjustable anchors, two central fixed anchors, and two forward vertically adjustable anchors.

9. The mounting system of claim 1 further comprising a locking plate engageable with the adapter plate and the spinwheel.

10. A mounting system for an aircraft fuselage comprising:
one or more fixed anchors attached to the fuselage;
a plurality of vertically adjustable anchors attached to the fuselage, wherein each vertically adjustable anchor includes a spinwheel on a threaded shaft, wherein the fixed anchors and interspersed with the vertically adjustable anchors and wherein the fixed anchors are centrally located along outer edges of the adapter plate and the vertically adjustable anchors are positioned at ends of the adapter plate; and an adapter plate attached to the fixed anchors and the adjustable anchors, wherein a contact surface of the spinwheel directly engages with the adapter plate.

11. The mounting system of claim 10 wherein the adapter plate includes a channel to accommodate an outer diameter of the spinwheel.

12. The mounting system of claim 11 wherein the contact surface of the spinwheel engages with a connection surface of the adapter plate within the channel.

13. A method for mounting hardware and/or electronics to an aircraft fuselage comprising:

attaching two or more fixed anchors to the fuselage;

attaching a plurality of vertically adjustable anchors to the fuselage, wherein each vertically adjustable anchor includes a spinwheel on a threaded shaft; and attaching an adapter plate to the fixed anchors and the adjustable anchors;

directly engaging the adapter plate with the vertically adjustable anchors wherein a contact surface of the spinwheel directly engages with the adapter plate;

rotating the spinwheel into direct contact with the underside of the adapter plate before fastening the spinwheel to the adapter plate; and fastening the spinwheel to the adapter plate with a plurality of fasteners.

14. The method of claim 13 further comprising:

first attaching the fixed anchors to the adapter plate and then the adjustable anchors.

15. The method of claim 13 further comprising:

Attaching ground straps to each of the fixed anchors and adjustable anchors.

16. A mounting system for an aircraft fuselage comprising:

one or more fixed anchors attached to the fuselage;

a plurality of vertically adjustable anchors attached to the fuselage, wherein each vertically adjustable anchor includes a spinwheel on a threaded shaft; and an adapter plate attached to the fixed anchors and the adjustable anchors, wherein a contact surface of the spinwheel directly engages with the adapter plate and wherein a plurality of fasteners are attached between each spinwheel and the adapter plate.

17. The mounting system of claim 16 wherein the plurality of fasteners are accessible from a top of the adapter plate.

18. The mounting system of claim 16 wherein the adapter plate includes a channel to accommodate an outer diameter of the spinwheel.

19. A mounting system for an aircraft fuselage comprising:

one or more fixed anchors attached to the fuselage;

a plurality of vertically adjustable anchors attached to the fuselage, wherein each vertically adjustable anchor includes a spinwheel on a threaded shaft; and an adapter plate attached to the fixed anchors and the adjustable anchors, wherein a contact surface of the spinwheel directly engages with the adapter plate, wherein the adapter plate is attached to one aft fixed anchor, two mid-aft vertically adjustable anchors, two central fixed anchors, and two forward vertically adjustable anchors.

* * * * *